United States Patent [19]

Sluyterman

[11] Patent Number: 5,729,301
[45] Date of Patent: Mar. 17, 1998

[54] METHOD AND DEVICE FOR REDUCING MOIRE WHEN DISPLAYING A VIDEO SIGNAL

[75] Inventor: Albertus A. S. Sluyterman, Eindhoven, Netherlands

[73] Assignee: U.S. Philips Corporation, New York, N.Y.

[21] Appl. No.: 707,452

[22] Filed: Sep. 4, 1996

[30] Foreign Application Priority Data

Sep. 7, 1995 [EP] European Pat. Off. .............. 95202416

[51] Int. Cl.⁶ ...................................................... H04N 5/21
[52] U.S. Cl. ...................................... 348/607; 348/806
[58] Field of Search ............................... 348/607, 806, 348/615; H04N 5/21

[56] References Cited

U.S. PATENT DOCUMENTS 4,908,581 3/1990 Honjo ....................................... 348/607

5,440,353 8/1995 Yamazaki ................................. 348/806

FOREIGN PATENT DOCUMENTS 4-40173 2/1992 Japan .

*Primary Examiner*—Sherrie Hsia
*Attorney, Agent, or Firm*—Edward W. Goodman

[57] ABSTRACT

In a method of reducing a moiré phenomenon upon display of a video signal on a display device (4), the video signal is low-pass filtered (2) with a cut-off frequency substantially corresponding to a maximum frequency of a baseband portion of the video signal, to obtain a low-pass filtered video signal. The low-pass filtered video signal is filtered (3) in accordance with a transfer function substantially corresponding to the inverse of the transfer function of the display device, to obtain a filtered signal. Finally, the filtered signal is applied (3a) to the display device (4).

6 Claims, 1 Drawing Sheet

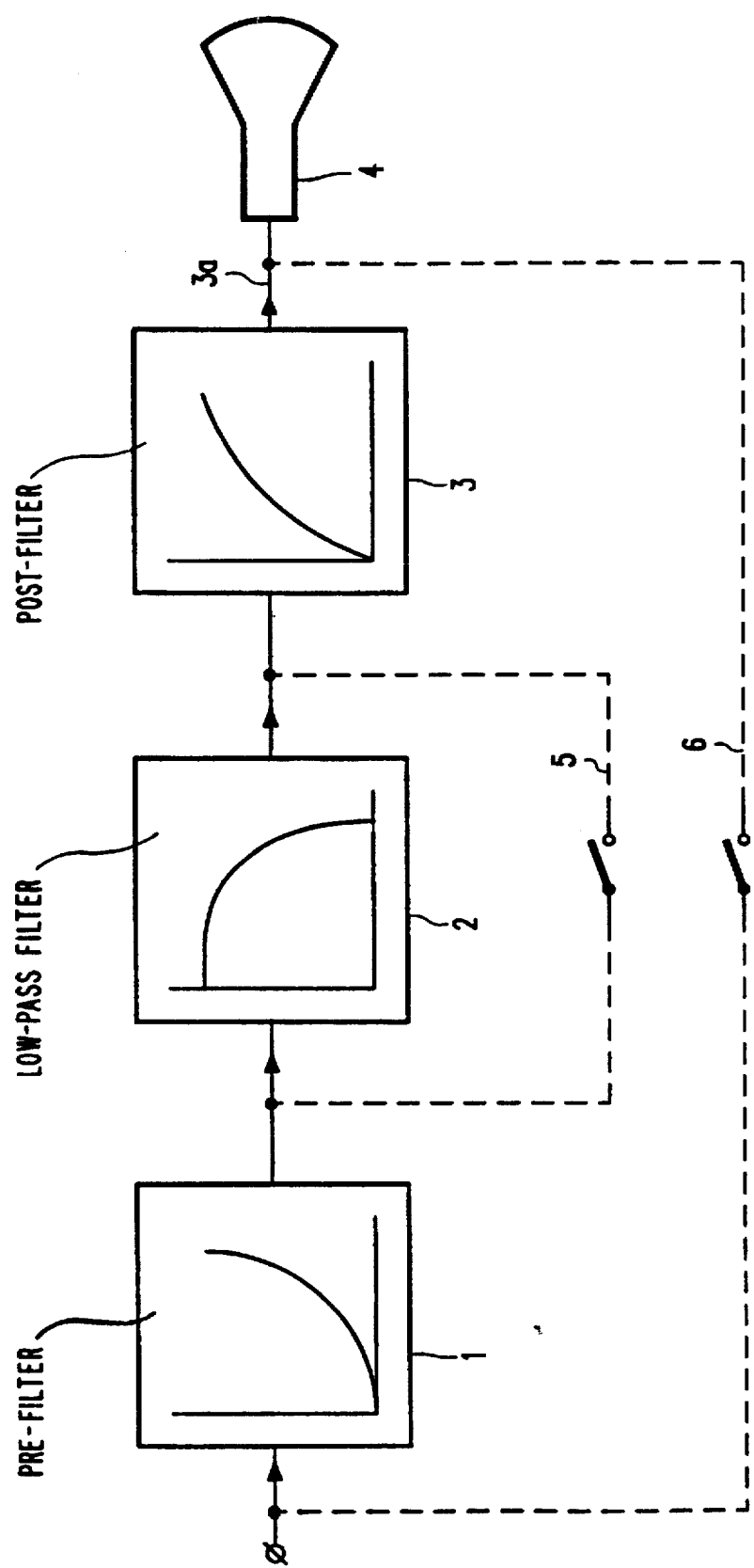

METHOD AND DEVICE FOR REDUCING MOIRE WHEN DISPLAYING A VIDEO SIGNAL

BACKGROUND OF THE INVENTION

1. Field of the Invention

The invention relates to a method of and a device for video moiré reduction, and to an image display apparatus comprising a moiré reduction device.

A display monitor operating under the raster scanning system repeats the horizontal scanning of an electron beam and displays a raster by vertically moving the resulting scanning lines. In a cathode ray tube, the dot pitch of the fluorescent material on the screen of the CRT that can emit a fluorescence is determined by the aperture pitch of the shadow mask. Thus, in case of displaying a pattern that repeats ON and OFF of a display for every dot in the horizontal direction, the pitch of the dots may sometimes interfere with the aperture pitch in the shadow mask, thereby bringing a horizontal moiré phenomenon. In order to reduce this phenomenon, a number of systems have been proposed.

2. Description of the Related Art

EP-A-0,557,971, corresponding to U.S. Pat. No. 5,440,353, briefly sets out some of the previously proposed systems and their disadvantages, and discloses a display monitor in which a horizontal moiré phenomenon is reduced by producing a control signal by a moiré cancelling circuit comprising a frequency divider and a horizontal position shifting circuit, and supplying the control signal to a deflection circuit block. In effect, horizontal sharpness is reduced by horizontally shifting neighboring lines in opposite directions. This results in that a vertical line becomes crenated. In one embodiment, the shift is effected by means of an additional deflection coil.

SUMMARY OF THE INVENTION

It is, inter alia, an object of the invention to provide a much simpler solution for the moiré problem. To this end, a first aspect of the invention provides a method of reducing a moiré phenomenon upon display of a video signal on a display device, comprising the steps of low-pass filtering said video signal with a cut-off frequency substantially corresponding to a maximum frequency of a baseband portion of said video signal, to obtain a low-pass filtered video signal; filtering the low-pass filtered video signal in accordance with a transfer function substantially corresponding to the inverse of the transfer function of the display device, to obtain a filtered signal; and applying the filtered signal to the display device. A second aspect of the invention provides a device for reducing a moiré phenomenon upon display of a video signal on a display device, comprising means for low-pass filtering said video signal with a cut-off frequency substantially corresponding to a maximum frequency of a baseband portion of said video signal, to obtain a low-pass filtered video signal; means for filtering the low-pass filtered video signal in accordance with a transfer function substantially corresponding to the inverse of the transfer function of the display device, to obtain a filtered signal; and means for applying the filtered signal to the display device. A third aspect of the invention provides an image display apparatus comprising a device for reducing a moiré phenomenon upon display of a video signal on a display device, the apparatus comprising means for low-pass filtering said video signal with a cut-off frequency substantially corresponding to a maximum frequency of a baseband portion of said video signal, to obtain a low-pass filtered video signal; means for filtering the low-pass filtered video signal in accordance with a transfer function substantially corresponding to the inverse of the transfer function of the display device; and the display device for displaying the filtered signal.

In one embodiment, the video signal is low-pass filtered before being applied to the gun of the cathode ray tube. The pass-bandwidth of the low-pass filter substantially corresponds to the bandwidth of a baseband portion of the video signal. Between the low-pass filter and the gun, a filter is placed, the transfer function of which substantially corresponds to the inverse of the transfer characteristic of the gun. Advantageously, the low-pass filter is preceded by a filter having a transfer function which corresponds to the transfer characteristic of the gun.

The invention is based on the recognition that video moiré is often caused by higher harmonics of the baseband video signal. Thus, a low-pass filter should be present to remove these higher harmonics. However, the non-linear transfer characteristic of the gun in the cathode ray tube display results in a recreation of the higher harmonics before the electron ray reaches the shadow mask, so that a low-pass filter alone is completely ineffective in reducing moiré, while any disadvantages of such a low-pass filter (undesired loss of sharpness) remain. Therefore, in accordance with a further aspect of the invention, between the low-pass filter and the gun, a further filter is present with a transfer function which substantially corresponds to the inverse of the transfer characteristic of the gun. The combination of the transfer functions of this further filter and the gun is now substantially linear, which results in that higher harmonics removed by the low-pass filter are no longer recreated by the gun, so that the combination of the low-pass filter and the further filter before the gun results in a device which effectively removes the moiré phenomenon in a very simple manner. An optimum overall transfer is obtained when the low-pass filter is preceded by a filter having a transfer function which substantially corresponds to the transfer characteristic of the gun.

These and other aspects of the invention will be apparent from and elucidated with reference to the embodiments described hereinafter.

BRIEF DESCRIPTION OF THE DRAWING

In the drawing:

FIG. 1 shows an embodiment of an image display apparatus comprising a moiré reducing device in accordance with the present invention.

DESCRIPTION OF THE PREFERRED EMBODIMENTS

In the embodiment of FIG. 1, the input video signal is first applied to a pre-filter 1 for pre-filtering the video signal in accordance with a transfer function substantially corresponding to the transfer function (also known as gamma-characteristic) of a display device 4, to obtain a pre-filtered video signal. The pre-filtered video signal is applied to a low-pass filter 2. The low-pass filter 2 has a cut-off frequency which substantially corresponds to a maximum frequency of a baseband portion of the video signal. Of importance, the low-pass filtered video signal is filtered in a post-filter 3 in accordance with a transfer function substantially corresponding to the inverse of the transfer function of the display device 4. Finally, the filtered signal is applied from the post-filter 3 to the display device 4.

If desired, the low-pass filter 2 can be bypassed (bypass path 5) if a moiré detector (not shown) indicates that there is no moiré present. Alternatively, the whole circuit 1–3 can be bypassed (bypass path 6) if no moiré is present. Such a bypass prevents a loss of sharpness when no moiré reduction is required.

It should be noted that the above-mentioned embodiments illustrate rather than limit the invention, and that those skilled in the art will be able to design many alternative embodiments without departing from the scope of the appended claims. It goes without saying that the various filtering steps in the claims can be carried out by a single filter, the transfer function of which corresponds to the convolution of the transfer functions of the separate filtering steps. Where transfer functions or bandwidths are said to be "corresponding" to other transfer functions or bandwidths, no exact identity is required. So, the pass-bandwidth of the low-pass filter 2 may be somewhat more or less than the baseband video bandwidth, and the transfer characteristics of the filters 1, 3 do not need to match exactly (the inverse of) the transfer characteristics of the guns of the CRT. In the claims, any reference signs placed between parentheses shall not be construed as limiting the claim. The invention can be implemented by means of hardware comprising several distinct elements, and by means of a suitably programmed computer. The invention is advantageously applied in computer monitors.

I claim:

1. A method of reducing a moiré phenomenon upon display of a video signal on a display device, comprising the steps:

low-pass filtering said video signal with a cut-off frequency substantially corresponding to a maximum frequency of a baseband portion of said video signal, to obtain a low-pass filtered video signal;

filtering the low-pass filtered video signal in accordance with a transfer function substantially corresponding to the inverse of the transfer function of the display device, to obtain a filtered signal; and applying the filtered signal to the display device.

2. A method as defined in claim 1, wherein said video signal is filtered in accordance with a transfer function substantially corresponding to the transfer function of the display device before being applied to said low-pass filtering step.

3. A device for reducing a moiré phenomenon upon display of a video signal on display device, comprising:

means for low-pass filtering said video signal with a cut-off frequency substantially corresponding to a maximum frequency of a baseband portion of said video signal, to obtain a low-pass filter video signal;

means for filtering the low-pass filtered video signal in accordance with a transfer function substantially corresponding to the inverse of the transfer function of the display device, to obtain a filtered signal; and means for applying the filtered signal to the display device.

4. A device as defined in claim 3, further comprising means for pre-filtering said video signal in accordance with a transfer function substantially corresponding to the transfer function of the display device to obtain a pre-filtered video signal, and for applying said pre-filtered video signal to said low-pass filtering means.

5. A device as defined in claim 3, further comprising means for bypassing at least said low-pass filtering means.

6. An image display apparatus comprising a device for reducing a moiré phenomenon upon display of a video signal on a display device, the apparatus comprising:

means for low-pass filtering said video signal with a cut-off frequency substantially corresponding to a maximum frequency of a baseband portion of said video signal, to obtain a low-pass filtered video signal;

means for filtering the low-pass filtered video signal in accordance with a transfer function substantially corresponding to the inverse of the transfer function of the display device; and the display device for displaying the filtered low-pass filtered video signal.

* * * * *